United States Patent
Tanaka et al.

(10) Patent No.: US 7,654,926 B2
(45) Date of Patent: Feb. 2, 2010

(54) CONTINUOUSLY VARIABLE V-BELT TRANSMISSION

(75) Inventors: Hiroaki Tanaka, Yokohama (JP);
Masanori Taguchi, Takasaki (JP);
Makoto Momoi, Ayase (JP)

(73) Assignee: JATCO Ltd, Fuji-shi (JP)

( * ) Notice: Subject to any disclaimer, the term of this patent is extended or adjusted under 35 U.S.C. 154(b) by 315 days.

(21) Appl. No.: 11/709,284

(22) Filed: Feb. 22, 2007

(65) Prior Publication Data

US 2007/0213149 A1   Sep. 13, 2007

(30) Foreign Application Priority Data

Mar. 10, 2006   (JP) ............... 2006-065723

(51) Int. Cl.
*F16H 55/56* (2006.01)
*F16H 59/06* (2006.01)

(52) U.S. Cl. ............... 474/181; 474/8; 474/28; 477/43

(58) Field of Classification Search ........... 474/181, 474/8, 11, 12; *F16H 61/66, 59/06*
See application file for complete search history.

(56) References Cited

U.S. PATENT DOCUMENTS

| | | | | |
|---|---|---|---|---|
| 4,534,748 A | * | 8/1985 | Stieg et al. | 474/17 |
| 5,427,579 A | * | 6/1995 | Kanehara et al. | 474/28 |
| 6,135,915 A | * | 10/2000 | Aoki et al. | 477/43 |
| 6,568,280 B1 | * | 5/2003 | Park et al. | 73/828 |
| 7,261,672 B2 | * | 8/2007 | Frank et al. | 477/45 |

FOREIGN PATENT DOCUMENTS

| | | |
|---|---|---|
| EP | 1158210 A1 | 11/2001 |
| EP | 1333198 B1 | 8/2003 |
| JP | 2000-018347 | 1/2000 |

* cited by examiner

*Primary Examiner*—Robert A Siconolfi
*Assistant Examiner*—San Aung
(74) *Attorney, Agent, or Firm*—Global IP Counselors, LLP

(57) ABSTRACT

A continuously variable V-belt transmission basically has a driving pulley, a driven pulley and a V-belt wound around the pulleys. The frictional engagement between the pulleys and the V-belt is controlled by regulating pulley axial thrusts to the pulleys. The V-belt has a plurality of torque transmitting connected by an annular ring. A boundary-detection arrangement is provided to detect a boundary position between a first region, in which the elements are arranged without any gap therebetween, and a second region, in which the elements are arranged with a gap therebetween, along a portion of the driving pulley when torque is being transmitted. The detected boundary position is used to estimate the pulley axial thrust applied by the driving pulley against the V-belt, and to control the pulley axial thrust to a lower limit which ensures that the V-belt will not slip upon application of the maximum torque.

12 Claims, 8 Drawing Sheets

CONTINUOUSLY VARIABLE V-BELT TRANSMISSION

CROSS-REFERENCE TO RELATED APPLICATIONS

This application claims priority to Japanese Patent Application No. 2006-065723, filed on Mar. 10, 2006. The entire disclosure of Japanese Patent Application No. 2006-065723 is hereby incorporated herein by reference.

BACKGROUND OF THE INVENTION

1. Field of the Invention

The present invention generally relates to continuously variable V-belt transmissions. More specifically, the present invention relates to determining the thrust to be applied to a pulley of a continuously variable V-belt transmission.

2. Background Information

Conventional continuously variable V-belt transmissions basically have a driving pulley that receive an input torque from the engine, a driven pulley that outputs torque to a drive wheel and a V-belt that winds around the driving and driven pulleys to transmit rotation from the driving pulley to the driven pulley. In particular, the input torque to the driving pulley is transmitted from the driving pulley to the V-belt due to the friction between a pair of sheave faces of the driving pulley pressing against the V-belt. The V-belt then transmits the torque to the driven pulley due to the friction between a pair of sheave faces of the driven pulley pressing against the V-belt. The V-belt typically has a plurality of elements and a ring interconnecting the elements. When the sheave faces of the driving pulley pressing against the V-belt, each element of the V-belt is pushed out of the driving pulley to rotate the V-belt, the friction force between each element and the ring interconnecting the elements. This rotation of the V-belt results in a difference between the tensile force acting on the ring on the compression side and the tensile force acting on the ring on the stretch (tension) side.

The thrust with which a pulley is pressed against a V-belt is calculated by adding a thrust difference required to obtain a desired value of a pulley ratio to a value that has been set by multiplying a safety factor with a minimum thrust, which varies with different input torques, required to ensure that the V-belt will not slip. An example of such a continuously variable V-belt transmission is disclosed in Japanese Laid-Open Patent Publication No. 2000-18347A, which corresponds to U.S. Pat. No. 6,135,915.

In view of the above, it will be apparent to those skilled in the art from this disclosure that there exists a need for an improved continuously variable V-belt transmission. This invention addresses this need in the art as well as other needs, which will become apparent to those skilled in the art from this disclosure.

SUMMARY OF THE INVENTION

It has been discovered that if the safety factor, which is used to determine the thrust of the pulley, is set too high, then the safety factor not only limits the V-belt from slipping, but also causes excessive friction than required to occur on the V-belt. This excessive friction causes the load on the V-belt to rise, which may decrease the durability of the V-belt. In other words, if the setting of the safety factor is high, then an increased amount of the thrust is needed in the pulley to transmit the torque from the pulley to the V-belt. Thus, this situation requires high hydraulic pressure to be supplied to the pulley to supply this increased amount of the thrust to the pulley. As a result, the driving load of an oil pump, which serves as a source of hydraulic pressure, becomes high, and thus, resulting in poor fuel economy.

If the setting of the safety factor is low, the durability of the V-belt is ensured, but prevention of slip of the V-belt cannot be ensured when excessively large torque is inputted to the V-belt from the road surface or the like. Thus, possible resulting in the V-belt slipping. If the V-belt slips, then a scratch on the sheave face may occur. This scratch on the sheave face may damage of the V-belt.

The present invention was developed in view of these facts. One object of the present invention is to provide a continuously variable V-belt transmission, which limits slippage in the V-belt while also limiting the load on the V-belt.

In accordance with one aspect of the present invention, a continuously variable V-belt transmission is provided that basically comprises a driving pulley, a driven pulley, a V-belt, a boundary-detection arrangement and a thrust-estimation section. The driving pulley includes a fixed driving sheave half and a moveable driving sheave half. The driven pulley includes a fixed driven sheave half and a moveable driven sheave half. The V-belt is wound around the driving pulley and the driven pulley. The V-belt includes a plurality of elements and an annular ring consecutively connecting the elements together. The boundary-detection arrangement is configured and arranged relative to the V-belt to detect a boundary position between a first region, in which the elements are arranged without any gap therebetween, and a second region, in which the elements are arranged with a gap therebetween, along a portion of the driving pulley, when torque is transmitted from the driving pulley to the driven pulley via the V-belt. The thrust-estimation section is configured to estimate a pulley axial thrust with which the driving pulley engages the V-belt, based on the boundary position that was detected.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
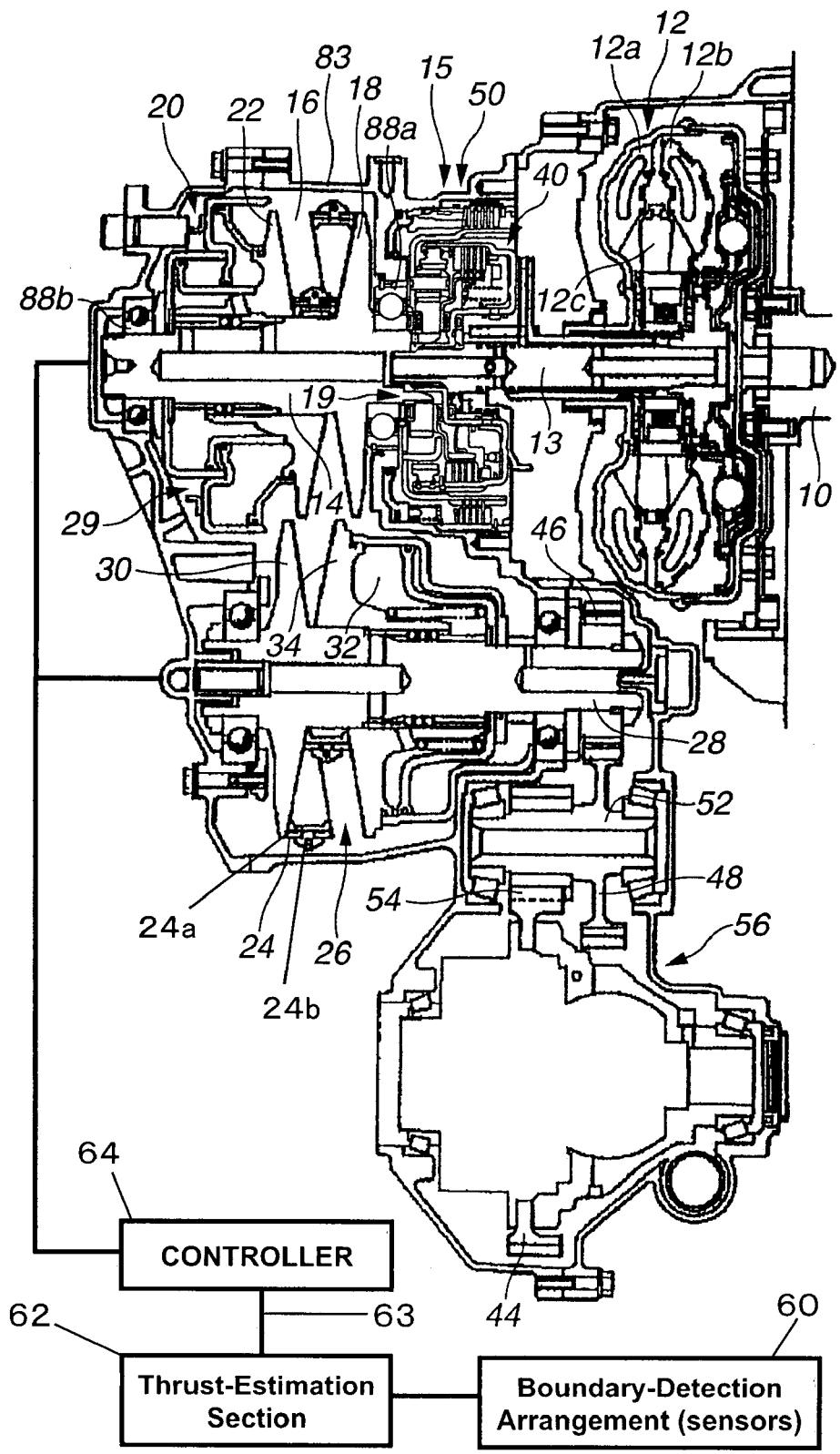
FIG. 1 is a cross sectional view of a continuously variable V-belt transmission that is configured in accordance with one preferred embodiment of the present invention.

Referring initially to FIG. 1, a V-belt continuously variable is illustrated in accordance with a first embodiment of the present invention. FIG. 1 is a cross sectional view of the continuously variable V-belt transmission. This continuously variable transmission is connected to an output shaft 10 of an engine to transmit rotation of the output shaft 10 of the engine to a drive wheel (not shown). The continuously variable transmission includes, among other components, a torque converter (start mechanism) 12, a driving shaft (an output shaft) 14, a forward reverse changeover mechanism 15, a V-belt continuously variable mechanism 29 and a differential 56. Thus, the continuously variable transmission is configured to transmit rotation of the output shaft 10 of the engine to the differential 56 at a selected pulley ratio and in a selected rotational direction.

The torque converter 12 includes a pump impeller 12a, a turbine runner 12b and a so-called lock-up mechanism. The lock-up mechanism is configured and arranged in a conventional manner to selectively connect the pump impeller 12a on the input side to the turbine runner 12b on the output side, or disconnect the pump impeller 12a from the turbine runner 12b by regulating hydraulic pressure within a lock-up chamber. The output shaft of the turbine runner 12b of the torque converter 12 is connected to a rotary shaft of an input shaft 13, which, in turn, is connected to the forward reverse changeover mechanism 15.

The forward reverse changeover mechanism 15 is of a known mechanism that basically includes a planetary gear set 19, a forward clutch 40 and a reverse brake 50. The forward reverse changeover mechanism 15 is configured and arranged in a conventional manner to change a rotational direction from the rotation derived from the output shaft 10 of the engine depending upon the direction that the vehicle is to be moving.

The V-belt continuously variable mechanism 29 has a driving pulley 16, a driven pulley 26, and a V-belt 24. The V-belt 24 is operatively connected between the driving and driven pulleys 16 and 26 for power transmission. The driving pulley 16 includes a fixed driving sheave half 18 and a moveable driving sheave half 22. The V-belt 24 has a plurality of torque transmitting elements 24a and an annular ring 24b interconnecting the elements 24a. The elements 24a are consecutively arranged one after another in a loop along the ring 24b. Thus, the elements 24a consecutively interposed between the fixed driving sheave half 18 and the moveable driving sheave half 22. The elements 24a and the ring 24b used in the present invention are well known in the field and thus, will not be illustrated or described in detail herein. Thus, a variety of V-belt configurations having a plurality of torque transmitting elements connected by an annular ring can be used with the present invention.

The driving shaft (an output shaft) 14 is supported by a pair of bearings 88a and 88b at both end portions for rotation relative to a casing 83. The driving pulley 16 is coaxially mounted to the driving shaft 14. In particular, the fixed driving sheave half 18 is connected to the driving shaft 14 for rotation as one body and the moveable driving sheave half 22 is arranged in opposed relationship with the fixed driving sheave half 18 to define a V-like groove therebetween. The moveable driving sheave half 22 can move in an axial direction along the driving shaft 14 in response to hydraulic pressure acting on a driving pulley cylinder chamber 20.

In addition, the driven pulley 26 is arranged coaxially with a driven shaft 28 that has a center axis arranged in parallel to that of the driving shaft 14. The driven pulley 26 has a fixed driven sheave half 30 connected to the driven shaft 28 for rotation as one body and a moveable driven sheave half 34 arranged in opposed relationship with the fixed driven sheave half 30. The moveable driven sheave half 34 can move in an axial direction along the driven shaft 28 in response to hydraulic pressure acting on a driven pulley cylinder chamber 32. The V-belt 24 is connected to the pulley grooves, which the driving and driven pulleys 16 and 26 are formed with, to constitute the V-belt continuously variable mechanism 29.

Figure 10:
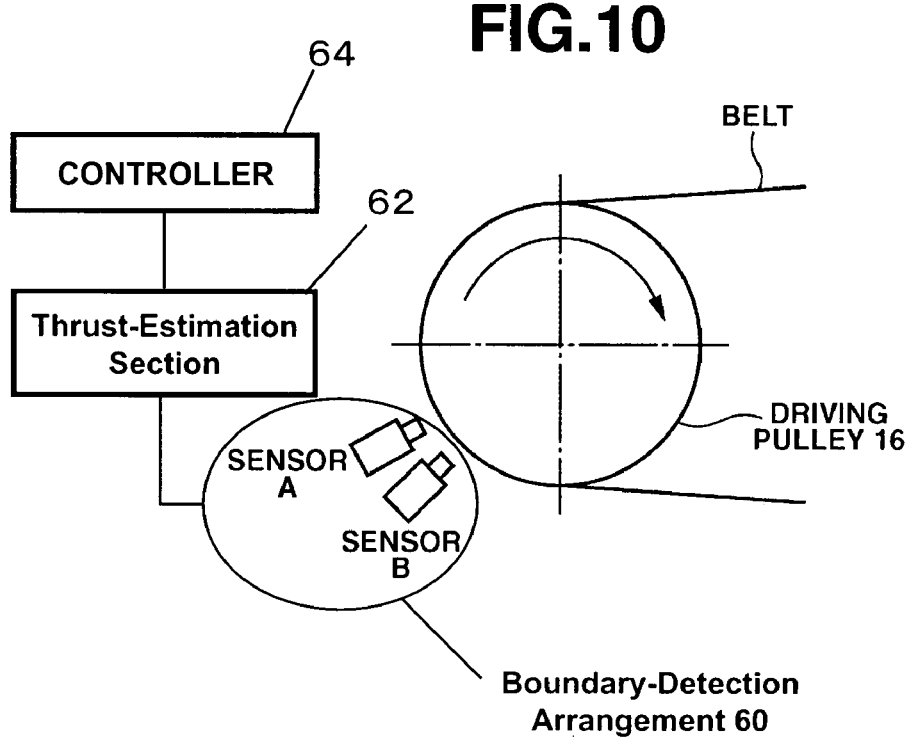
FIG. 10 is a simplified diagrammatic view of the V-belt and the driving pulley of the continuously variable V-belt transmission illustrated in FIG. 1 that shows one example of an arrangement of sensors.

As seen in FIGS. 1 and 10, the V-belt continuously variable mechanism 29 further includes a boundary-detection arrangement (sensors A and B) 60, a thrust-estimation section 62 and a controller 64. The controller 64 is operatively arranged to control the hydraulic pressure acting on the driving pulley cylinder chamber 20 so as to selectively move the moveable driving sheave half 22 in the axial direction along the driving shaft 14 to adjust the actual pulley axial thrust of the driving pulley 16 acting on the V-belt 24. Also the controller 64 is operatively arranged to control the hydraulic pressure acting on the driving pulley cylinder chamber 30 so as to selectively move the moveable driving sheave half 34 in the axial direction along the driven shaft 28 to adjust the actual pulley axial thrust of the driven pulley 26 acting on the V-belt 24. In particular, the controller 64 is operatively arranged to control the actual pulley axial thrust in both the driving pulley 16 and the driven pulley 26 acting on the V-belt 24 in accordance with a target pulley axial thrust as determined by the thrust-estimation section 62 based on the detection results from the boundary-detection arrangement 60.

In particular, as explained below in more detail, the boundary-detection arrangement 60 is configured and arranged relative to the V-belt 24 to detect a boundary position between a first region, in which the elements 24a are arranged without any gap therebetween, and a second region, in which the elements 24a are arranged with a gap therebetween, along a portion of the driving pulley 16, when torque is transmitted from the driving pulley 16 to the driven pulley 26 via the V-belt 24. The thrust-estimation section 62 is configured to estimate the pulley axial thrust with which the driving pulley 16 engages the V-belt 24, based on the boundary position that was the detected. This estimated pulley axial thrust can also be used to estimate the pulley axial thrust with which the driven pulley 26 engages the V-belt 24. The thrust-estimation section 62 includes an interface permitting access 63 to the estimated pulley axial thrust by the controller 64. The controller 64 is configured to control an actual pulley axial thrust, with which the driving pulley 16 and the driven pulley 26 engages the V-belt 24, such that the boundary position is located at a target boundary position. In other words, once the boundary-detection arrangement 60 detects the boundary position between the first and second regions, the thrust-estimation section 62 then estimates a pulley axial thrust for the driving pulley 16 which is equal to a lower limit which ensures that the V-belt 24 will not slip upon application of the maximum torque to the V-belt 24 and the controller 64 adjusts the actual pulley axial thrust applied to the driving pulley 16 so that the boundary position between the first and second regions moves to the target boundary position where the actual pulley axial thrust is equal to the lower limit. Because the present invention detects the boundary position between the first and second regions from the presence of a gap between the elements 24a and estimates the pulley axial thrust with which the driving pulley 16 engages the V-belt 24, it is now possible to estimate the pulley axial thrust with simple constitution but with good precision, to reduce the pulley axial thrust to lower the load on the V-belt 24, while preventing the V-belt 24 from slipping and improving the durability of the V-belt 24.

Still referring to FIG. 1, the differential 56 will be briefly explained. The differential 56 basically includes a final gear 44, a driving gear 46, an idler gear 48, an idler shaft 52 and a pinion gear 54. The driving gear 46 is connected to the driving shaft 28 for rotation as one body. The driving gear 46 meshes with the idler gear 48 that is connected to the idler shaft 52 for rotation as one body. The pinion gear 54 is connected to the idler shaft 52 for rotation as one body. The pinion gear 54 meshes with the final gear 44.

The following description explains the transmission of input torque of the driving pulley 16. As mentioned before, an input torque to the driving pulley 16 is transmitted to the driven pulley 26 by transmitting the input torque from the driving pulley 16 to the elements 24a of the V-belt 24 due to the friction occurring between the V-belt 24 and a pair of sheave faces of the sheave halves 18 and 22. The input torque is then transmitted to the driven pulley 26 due to an element thrust acting between the elements 24a in a direction advancing the V-belt 24 when each element 24a is pushed out of the driving pulley 16. The friction force occurring between the elements 24a and the driving pulley 16 results in a portion of the ring 24b interconnecting the elements 24a to be placed under compression and a portion of the ring 24b interconnecting the elements 24a to be placed under tension. Thus, a difference occurs between the tensile force acting on the ring 24b on the compression side and the tensile force acting on the ring on the stretch (tension) side.

Figure 2:
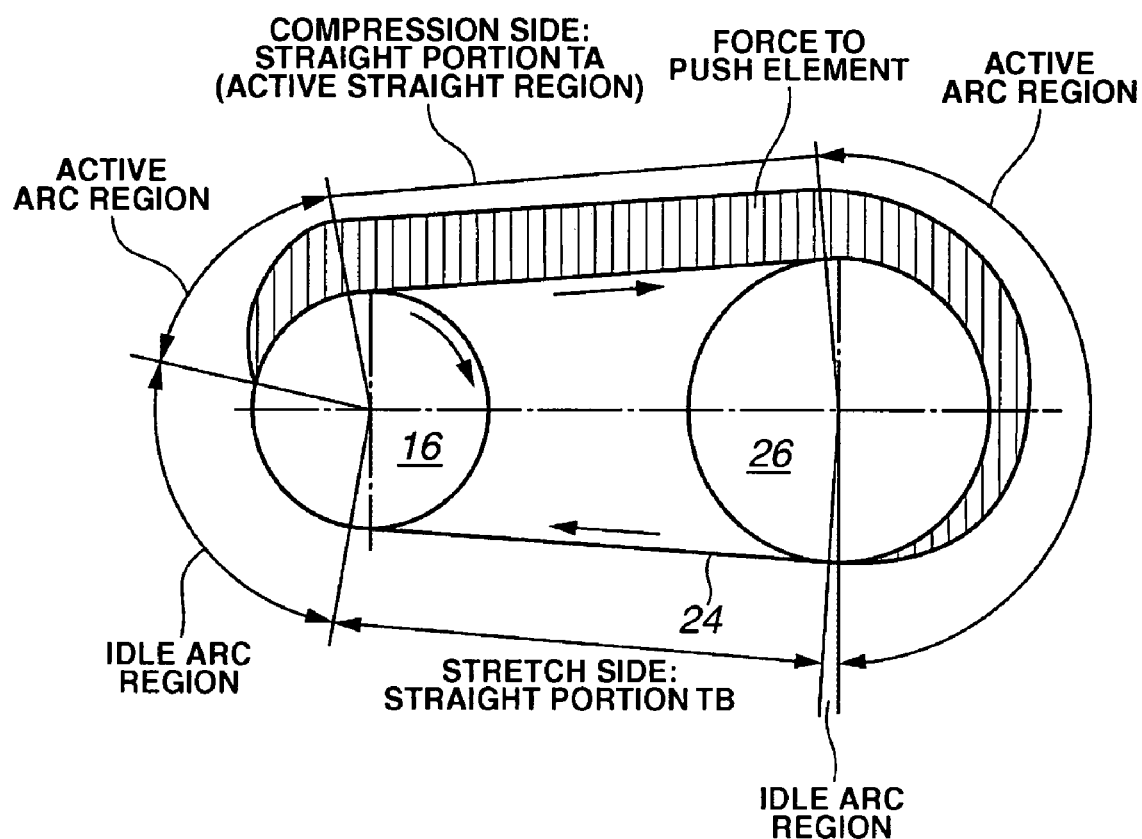
FIG. 2 is a simplified diagrammatic view of the V-belt and the pulleys of the continuously variable V-belt transmission illustrated in FIG. 1 that shows the transmission of torque by the V-belt from the driving pulley to the driven pulley.

FIG. 2 is a view illustrating the transmission of torque by the V-belt 24 when the pulley ratio is larger than 1. The load acting on the V-belt 24 during transmission of a torque is calculated by dividing the input torque by a pitch radius of the driving pulley 16 (a radius from the center of rotation of the driving pulley 16 to the position contacting with the V-belt 24). The torque transmitted to the driven pulley 26 is equal to the sum of a difference between a ring tensile force within a straight portion TA on the compression side of the V-belt 24 and a ring tensile force within a straight portion TB on the stretch (tension) side of the V-belt 24 and a force to push the elements 24a.

As mentioned before, the transmission of a torque by the V-belt 24 is achieved by a frictional force due to contact of the driving pulley 16 with the V-belt 24, which results in a force being imparted to push the elements 24a, and a frictional force due to contact of each of the elements 24a with the ring 24b. Each of these frictional forces is obtained in accordance with the frictional coefficient at each of the contacts and a pulley axial thrust with which the driving pulley 16 contacts the V-belt 24.

Here, within a region of a pulley where a pulley axial thrust acts on the V-belt 24, it is possible to distinguish between an active arc region, in which a thrust acts on the elements 24a, and an idle arc region, in which there is no thrust acting on the elements 24a. If a region where a force to push acts on the elements 24a is named an active region (a first region), then the active arc region of each of the pulleys and the straight portion TA on the compression side (an active straight region) of the V-belt 24 constitute the active region. Within the active region, as mentioned later, the elements 24a are consecutively arranged one after another without any gap, and a torque transmitted to the elements 24a contacting with the driving pulley 16 is transmitted through the consecutively arranged elements 24a from the active straight region to the active arc region of the driving pulley 26 to accomplish the transmission of torque. In addition, the second region against the first region refers to the idle arc region of each of the pulleys 16 and 26 and the straight region TB.

Figure 3:
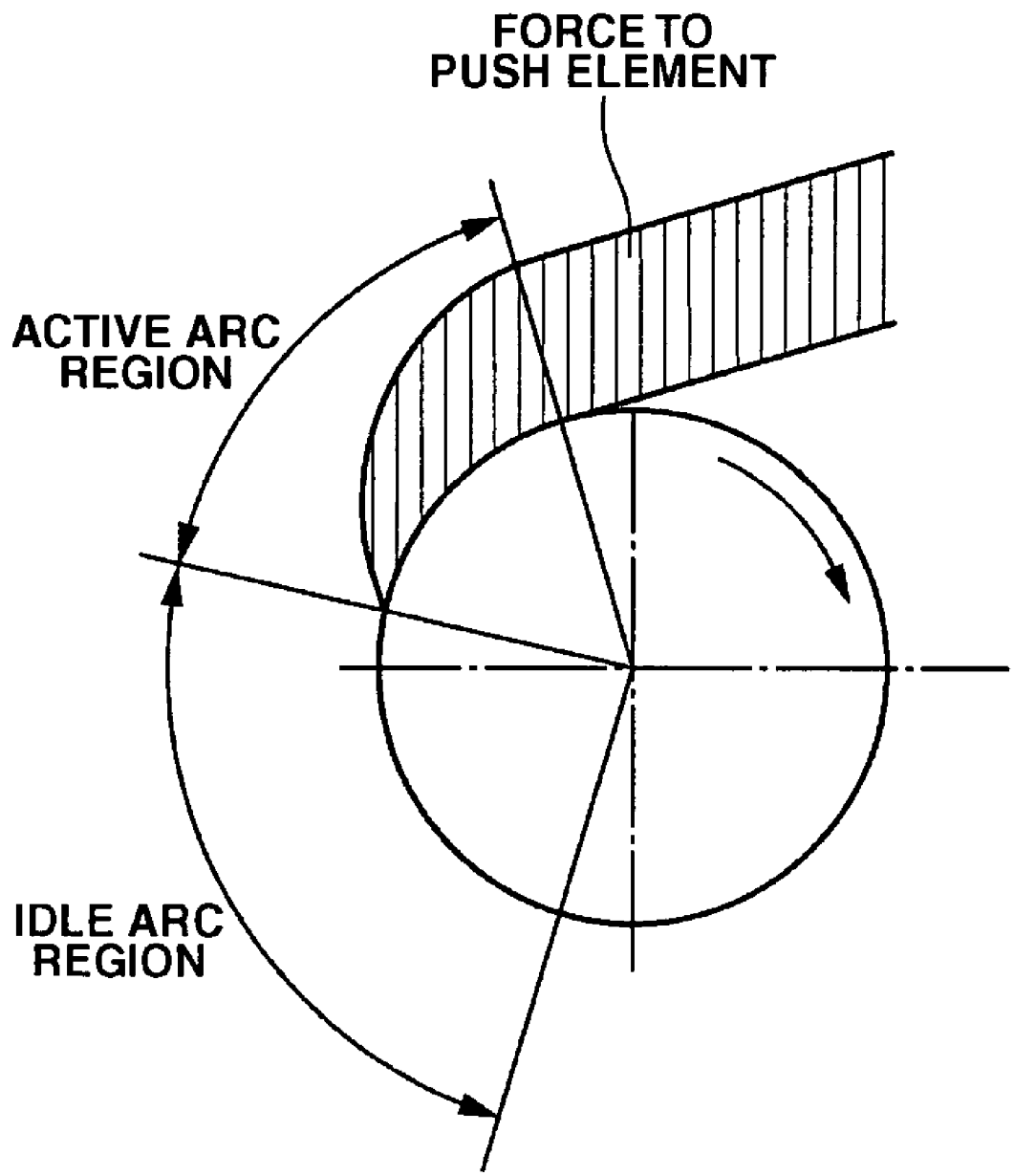
FIG. 3 is a simplified diagrammatic view of the V-belt and the driving pulley of the continuously variable V-belt transmission illustrated in FIG. 1 that shows the relationship between the active arc region and the pulley axial thrust.
Figure 4:
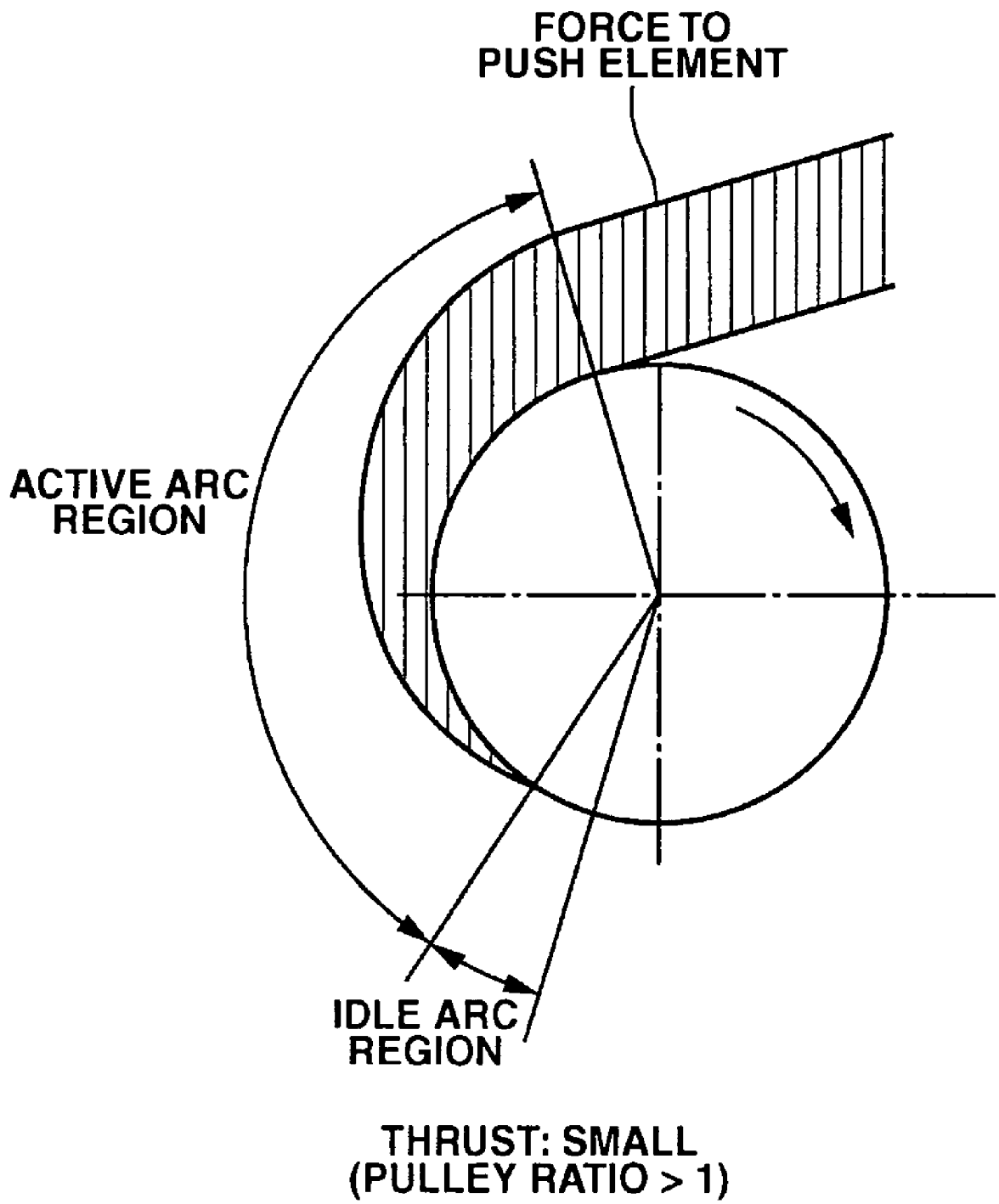
FIG. 4 is another simplified diagrammatic view of the V-belt and the driving pulley of the continuously variable V-belt transmission illustrated in FIG. 1 that shows the relationship between the active arc region and the pulley axial thrust.

The active arc region and the idle arc region change in distribution depending upon the amount of pulley axial thrust. As shown in FIG. 3, with the pulley ratio being greater than 1, the proportion of the active arc region becomes small, while the proportion of the idle arc region becomes comparatively large when the pulley axial thrust is large. As shown in FIG. 4, when the pulley axial thrust is small, the proportion of the active arc region becomes large, while the proportion of the idle arc region becomes small. In addition, when the pulley axial thrust is equal to the lower limit of pulley axial thrust required for the torque transmission (i.e., the safety factor=1), the active arc region only remains and the idle arc does not exist.

Figure 5:
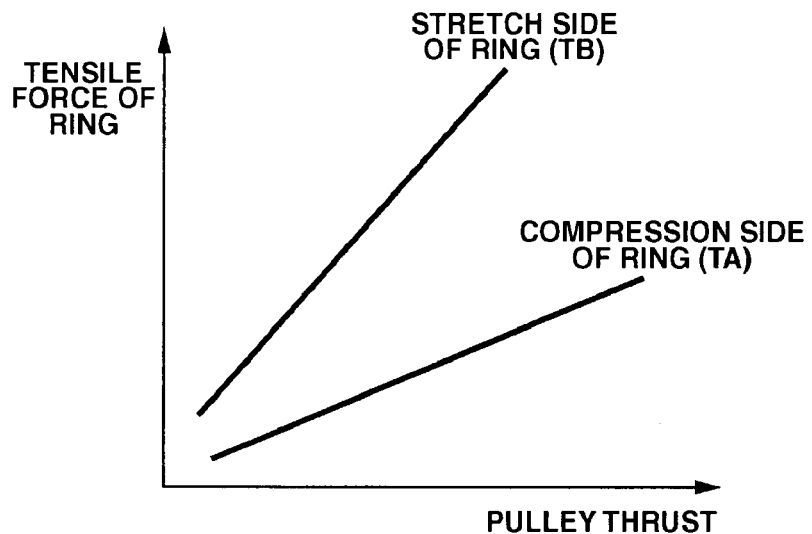
FIG. 5 is a graph showing the relationship between the tensile force on the ring and the pulley axial thrust.

Referring to FIG. 5, the following description explains the relationship between the pulley axial thrust and the tensile force of the ring 24b when the pulley ratio is larger than 1. As shown in FIG. 5, the tensile force of the ring 24b is proportional to the pulley axial thrust, and, with the same thrust, the straight portion TA on the compression side produces smaller tensile force in the ring 24b than does the straight portion TB on the tension (stretch) side. Therefore, a drop in the pulley axial thrust causes a drop in the tensile force of the ring 24b, resulting in a drop in the stress of the ring 24b that is caused by the tensile force of the ring 24b, thus improving durability of the V-belt 24.

Figure 6:
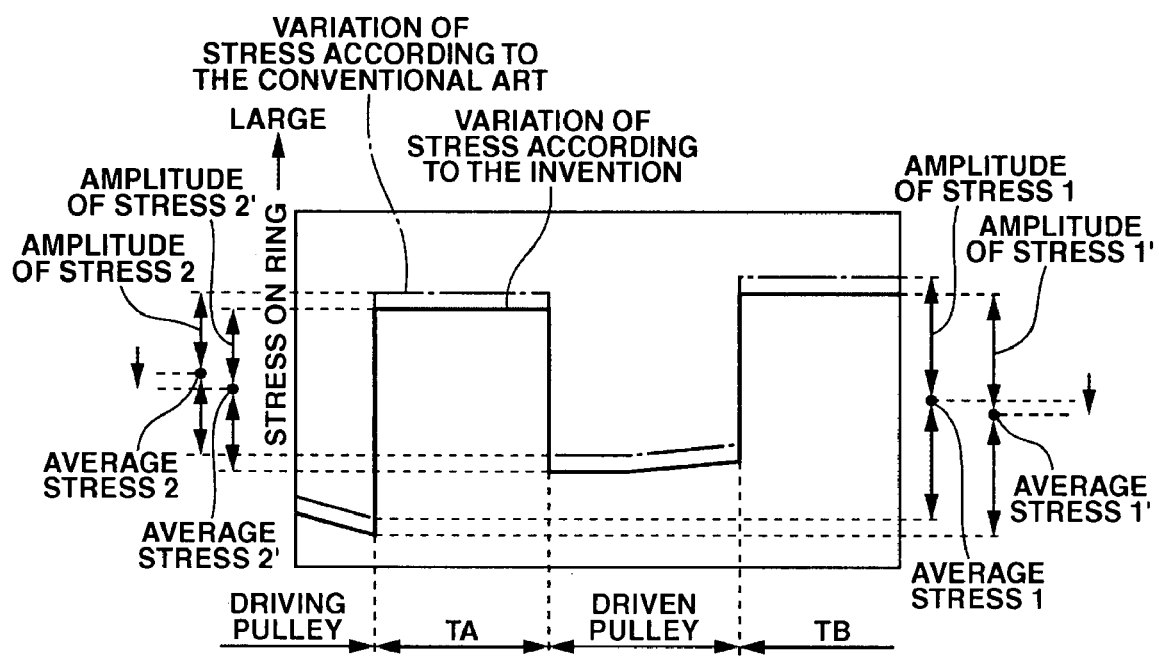
FIG. 6 is a diagram view showing the relationship between the stress on the ring and the pulley axial thrust.

FIG. 6 is a diagram illustrating a drop in the stress on the ring 24b due to a drop in the pulley axial thrust. In FIG. 6, the fully drawn line shows the stress on the ring 24b by the present invention, and the dash line shows the stress on the ring by the comparative example. As seen in FIG. 6, as for the change (amplitude) in stress among the driving pulley 16, the straight portion TA, the driven pulley 26 and the straight portion TB, the present invention and the comparative example are the same. However, as for an average stress, the present invention is lower than the comparative example because of a drop in the tensile force of the ring 24b caused by a drop in pulley axial thrust. This decrease in average stress causes an improvement in the durability of the ring 24b.

Figure 7:
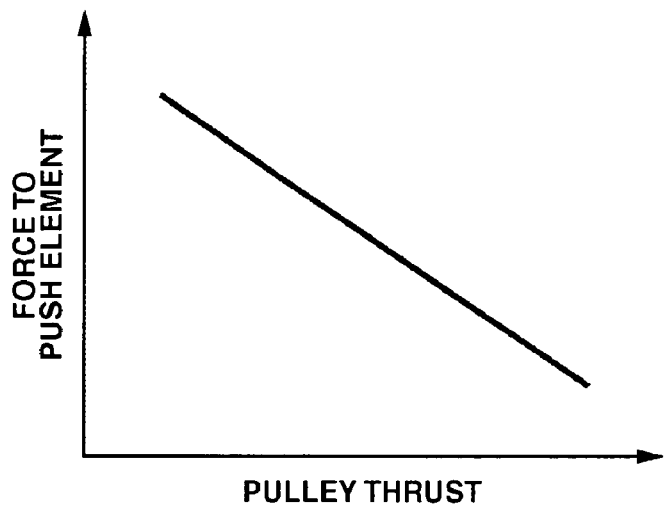
FIG. 7 is a graph showing the relationship between the force to push element and the pulley axial thrust.
Figure 8:
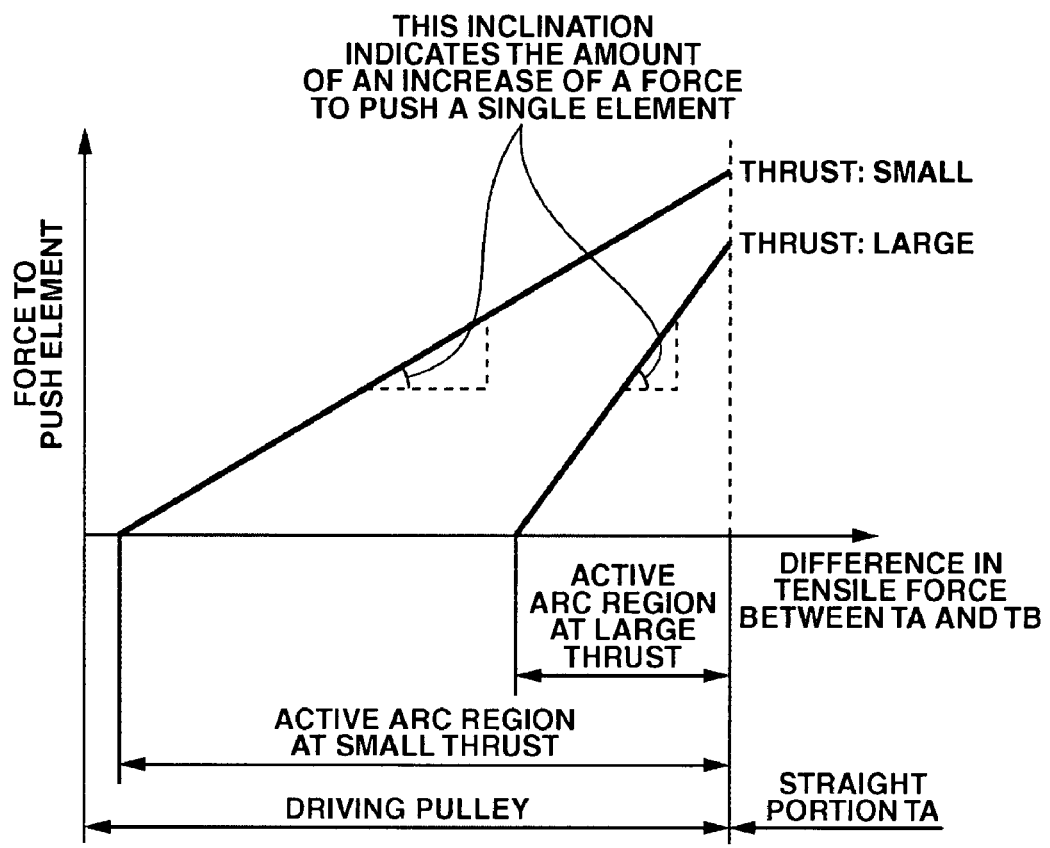
FIG. 8 is a graph showing the relationship between the difference in tensile force and the pulley axial thrust.

FIG. 7 shows the relationship between the force to push the elements 24a and the pulley axial thrust when the pulley ratio is larger than 1. As shown in this Figure, the force to push the elements 24a is inversely proportional to the pulley axial thrust so that the total of the forces to push the elements 24a becomes large when the pulley axial thrust becomes small. Here, as mentioned before, the smaller the pulley axial thrust, the wider is the active arc, in which a force to push the elements 24a appears. Therefore, as shown in FIG. 8, there is a decrease in a force to push a single element 24a (i.e., in FIG. 7, the amount of increase in a force to push a single element 24a becomes small when an inclination of the straight line becomes small), causing a decrease in total of forces to push the elements 24a. This causes a drop in the stress on the elements 24a that is caused due to the forces to push the elements 24a. Thus, a improving the durability of the V-belt 24.

Figure 9:
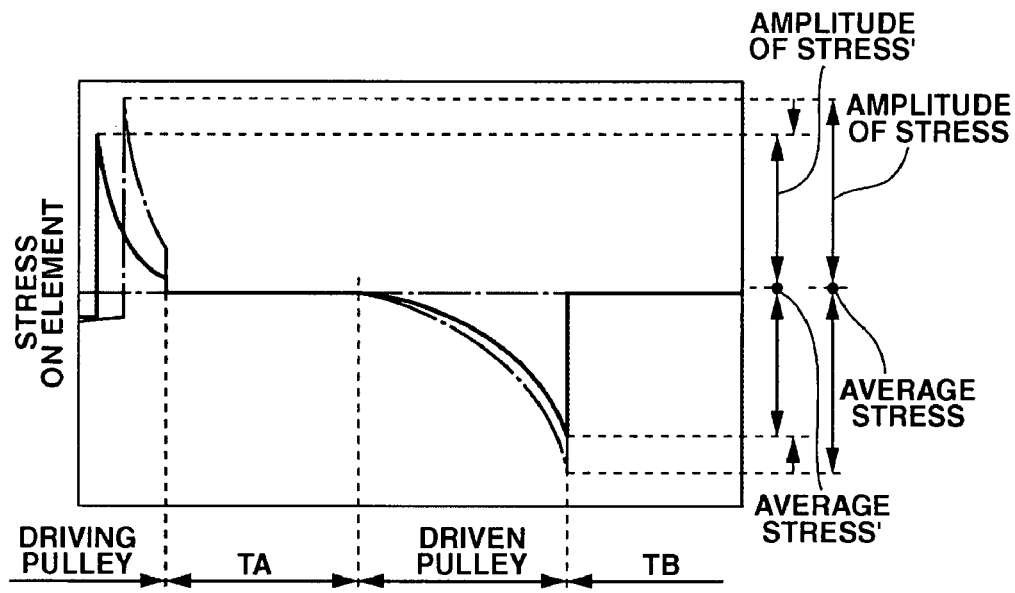
FIG. 9 is diagram showing the relationship between the stress on element and the pulley axial thrust.

FIG. 9 is a diagram illustrating a drop in the stress of the elements 24a due to a drop in pulley axial thrust. In FIG. 9, the fully drawn line shows the stress on the elements 24a by the present invention, and the dash line shows the stress on the elements 24a by the comparative example. As mentioned before, a drop in the pulley axial thrust causes an increase in the force to push the elements 24a, but the drop in the pulley axial thrust causes an increase in the active arc region, causing a drop in stress on a single element in total. In the present invention, a stress on the elements 24a is herein used to refer to the amplitude of stress. Turning back to FIG. 9, a drop in the pulley axial thrust causes a decrease in the maximum stress on the elements 24a, which occurs on the driving pulley 16, and it causes an increase in the minimum stress on the elements 24a, which occurs in the driven pulley 26. Therefore, the amplitude of stress, which is a difference between the maximum stress on the elements 24a and the minimum stress on the elements 24a, decreases, causing an improvement of durability of the elements 24a due to the decrease in the amplitude of stress. In addition, the average stress remains unaltered.

The preceding description has explained that it is possible to improve durability of the V-belt 24 by decreasing the pulley axial thrust. However, if the safety factor, which was mentioned before for setting the pulley axial thrust, is set equal to 1, a slip of the V-belt occurs upon application of the maximum torque. In this case, the safety factor=1 is equivalent to the maximum of a driving torque applied to the driving pulley by a source of drive, and the maximum torque refers to a torque that is determined after taking into account a torque applied to the continuously variable V-belt transmission from the road surface and a driving torque.

On this account, it is necessary for the controller 64 to set the actual pulley axial thrust to the lower limit which can ensure that the V-belt 24 does not slip upon application of the maximum torque. Here, as mentioned before, the pulley axial thrust, the active arc region, and the idle arc region hold the certain relation. In other words, it is possible to estimate the pulley axial thrust from the boundary position between the active arc region and the idle arc region. In short, it is possible to achieve a decrease in the pulley axial thrust set by the controller 64 by controlling the actual pulley axial thrust such that the boundary position between the active arc region and the idle arc region moves to a target boundary position corresponding to the pulley axial thrust which ensures that the V-belt 24 will not slip upon application of the maximum torque.

Therefore, it is possible to set the lower limit of the pulley axial thrust which ensures that the V-belt 24 will not slip by determining through experimentation or the like, the pulley axial thrust which ensures that the V-belt 24 will not slip upon application of the maximum torque, setting the boundary position between the active arc region and the idle arc region which corresponds to this pulley axial thrust, and correcting the actual pulley axial thrust so that the actual boundary position exist at this set or target boundary position.

As a method of detecting the position of the boundary between the active arc region and the idle arc region, it is proposed to employ two sensors A and B that are arranged in the circumference direction of the driving pulley 16 as shown in FIG. 10. This boundary-detection arrangement 60 operates based on a difference between the external appearance of the train of the elements 24a within the active arc region and the external appearance of the train of the elements 24a within the idle arc region. In addition, the sensors A and B are so arranged as to detect the corresponding boundary position between the active arc region and the idle arc region to the lower limit of pulley axial thrust which ensures that the V-belt 24 will not slip upon application of the maximum torque load.

Figure 11:
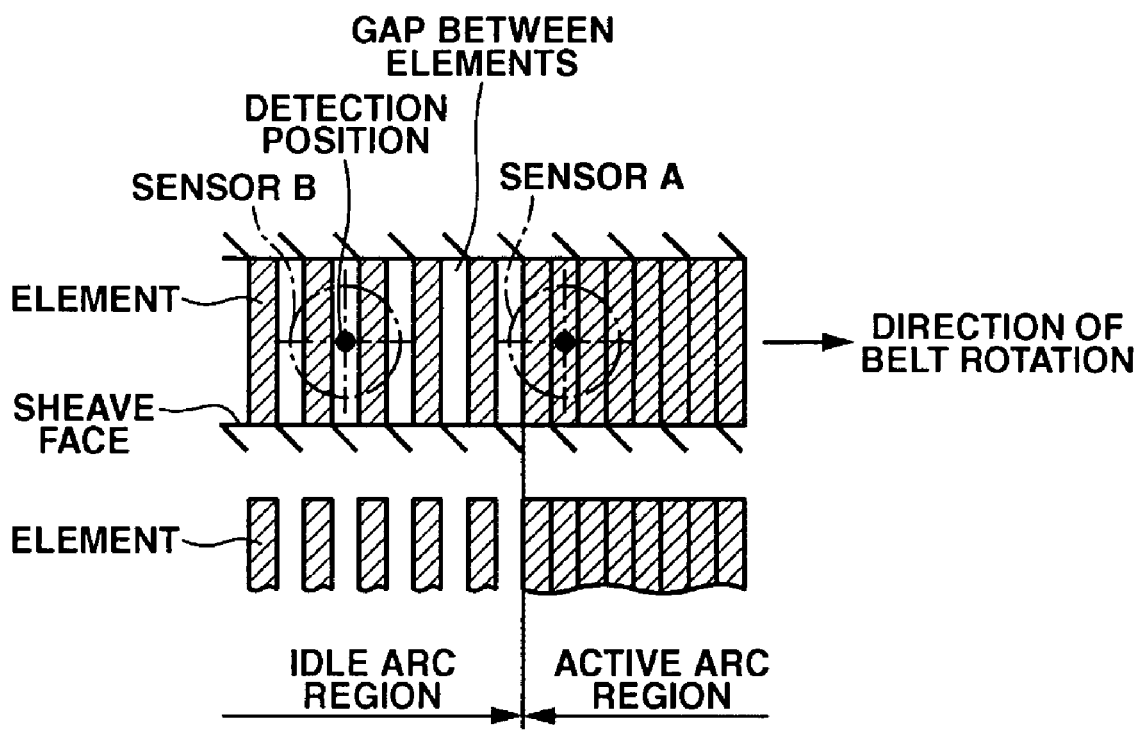
FIG. 11 is a diagram showing the state of the elements of the V-belt within the active arc region and the state of the elements of the V-belt within the idle arc region.

More specifically, as shown in FIG. 11, because within the active arc region, the elements 24a are arranged in close contact one after another without any gap, while, within the idle arc region, the elements 24a are loosely arranged with a gap between the adjacent elements 24a, the sensors A and B detect this gap. And, when the result of detection by the sensor A disposed downstream with respect to the direction of movement of the V-belt indicates that there is no gap and the result of detection by the sensor B disposed upstream indicates that there is a gap, the boundary position between the active arc region and the idle arc region is determined to exist between these two sensors and the results of detection by the two sensors A and B make it possible to determine whether the selected pulley axial thrust occurs. When the boundary position does not exist between the two sensors, the pulley axial thrust is controlled by the controller 64 to correct the pulley axial thrust until the boundary position exists between the two sensors A and B.

Because, when a torque is transmitted from the driving pulley 16 to the driven pulley 26, the region of the V-belt 24 which is interposed by the driving pulley 16 is separated into a first region, in which the elements 24a are arranged one after another without any gap and a second region in which the elements 24a are arranged with a gap, and the present invention detects the boundary between the first and second regions from the presence of a gap between the elements 24a and estimates a pulley axial thrust with which the driving pulley 16 interpose the V-belt 24, it is now possible to estimate the pulley axial thrust with simple constitution but with good precision, to reduce the pulley axial thrust while preventing the V-belt 24 from slipping, to lower the load on the V-belt, and to improve the durability of the V-belt 24.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A continuously variable V-belt transmission comprising:
   a driving pulley including a fixed driving sheave half and a moveable driving sheave half;
   a driven pulley including a fixed driven sheave half and a moveable driven sheave half;
   a V-belt wound around the driving pulley and the driven pulley, the V-belt including a plurality of elements and an annular ring consecutively connecting the elements together;
   a boundary-detection arrangement configured and arranged relative to the V-belt to detect a boundary position between a first region, in which the elements are arranged without any gap therebetween, and a second region, in which the elements are arranged with a gap therebetween, along a portion of the driving pulley, when torque is transmitted from the driving pulley to the driven pulley via the V-belt; and a thrust-estimation section configured to estimate a pulley axial thrust with which the driving pulley engages the V-belt, based on the boundary position that was detected, the boundary-detection arrangement including at least two sensors that are arranged at a predetermined interval in a direction of the circumference of the driving pulley to detect presence of a gap between the elements in order to detect the boundary position between the first region and the second region.

2. The continuously variable V-belt transmission as recited in claim 1, wherein the driving pulley is configured and arranged such that the boundary position between the first and the second regions varies with different magnitudes of the pulley axial thrust being applied to the driving pulley; and the sensors are arranged in an area of the driving pulley to detect the boundary position between the first and the second regions that corresponds to a lower limit value of the pulley axial thrust which prevents the V-belt from slipping.

3. The continuously variable V-belt transmission as recited in claim 1, wherein the driving pulley is configured and arranged such that when the pulley axial thrust is large, the first region is small and the second region is large, and when the pulley axial thrust is small, the first region is large and the second region is small.

4. The continuously variable V-belt transmission as recited in claim 1, further comprising:

a controller configured to control an actual pulley axial thrust, with which the driving pulley engages the V-belt, such that the boundary position is located at a target position.

5. The continuously variable V-belt transmission as recited in claim 1, wherein the thrust-estimation section include an interface permitting access to the estimated pulley axial thrust.

6. The continuously variable V-belt transmission as recited in claim 4, wherein the driving pulley is configured and arranged such that the boundary position between the first and the second regions varies with different magnitudes of the pulley axial thrust being applied to the driving pulley; and the sensors are arranged in an area of the driving pulley to detect the boundary position between the first and the second regions that corresponds to a lower limit value of the pulley axial thrust which prevents the V-belt from slipping.

7. The continuously variable V-belt transmission as recited in claim 6, wherein the driving pulley is configured and arranged such that when the pulley axial thrust is large, the first region is small and the second region is large, and when the pulley axial thrust is small, the first region is large and the second region is small.

8. The continuously variable V-belt transmission as recited in claim 5, wherein the driving pulley is configured and arranged such that the boundary position between the first and the second regions varies with different magnitudes of the pulley axial thrust being applied to the driving pulley; and the sensors are arranged in an area of the driving pulley to detect the boundary position between the first and the second regions that corresponds to a lower limit value of the pulley axial thrust which prevents the V-belt from slipping.

9. The continuously variable V-belt transmission as recited in claim 8, wherein the driving pulley is configured and arranged such that when the pulley axial thrust is large, the first region is small and the second region is large, and when the pulley axial thrust is small, the first region is large and the second region is small.

10. A continuously variable V-belt transmission comprising:

driving pulley means for transmitting a torque;

driven pulley means for receiving the torque from the driving pulley means;

V-belt means for transmitting the torque from the driving pulley means to the driven pulley means, the V-belt including a plurality of elements and an annular ring consecutively connecting the elements together;

boundary-detection means for detecting a boundary position between a compression region and a tension region, along a portion of the driving pulley means, when the torque is transmitted from the driving pulley means to the driven pulley means via the V-belt means; and thrust-estimation section means for estimating a pulley axial thrust with which the driving pulley means engages the V-belt means, based on the boundary position that was detected.

11. A method for controlling a continuously variable V-belt transmission, the method comprising:

inputting an input torque to a driving pulley including a fixed driving sheave half and a moveable driving sheave half to drive a driven pulley including a fixed driven sheave half and a moveable driven sheave half by a V-belt wound around the driving pulley and the driven pulley;

detecting a boundary position between a first region, in which a plurality of elements of the V-belt are arranged without any gap therebetween, and a second region, in which the elements are arranged with a gap therebetween, along a portion of the driving pulley when torque is transmitted from the driving pulley to the driven pulley via the V-belt; and estimating the pulley axial thrust with which the driving pulley engages the V-belt, based on the boundary position that was detected, the detecting of the boundary position including detecting presence of a gap between the elements by using at least two sensors arranged at a predetermined interval in a direction of the circumference of the driving pulley.

12. The method as recited in claim 10, further comprising controlling an actual pulley axial thrust, with which the driving pulley engages the V-belt such that the boundary position is located at a target position.

* * * * *